Figure 1:
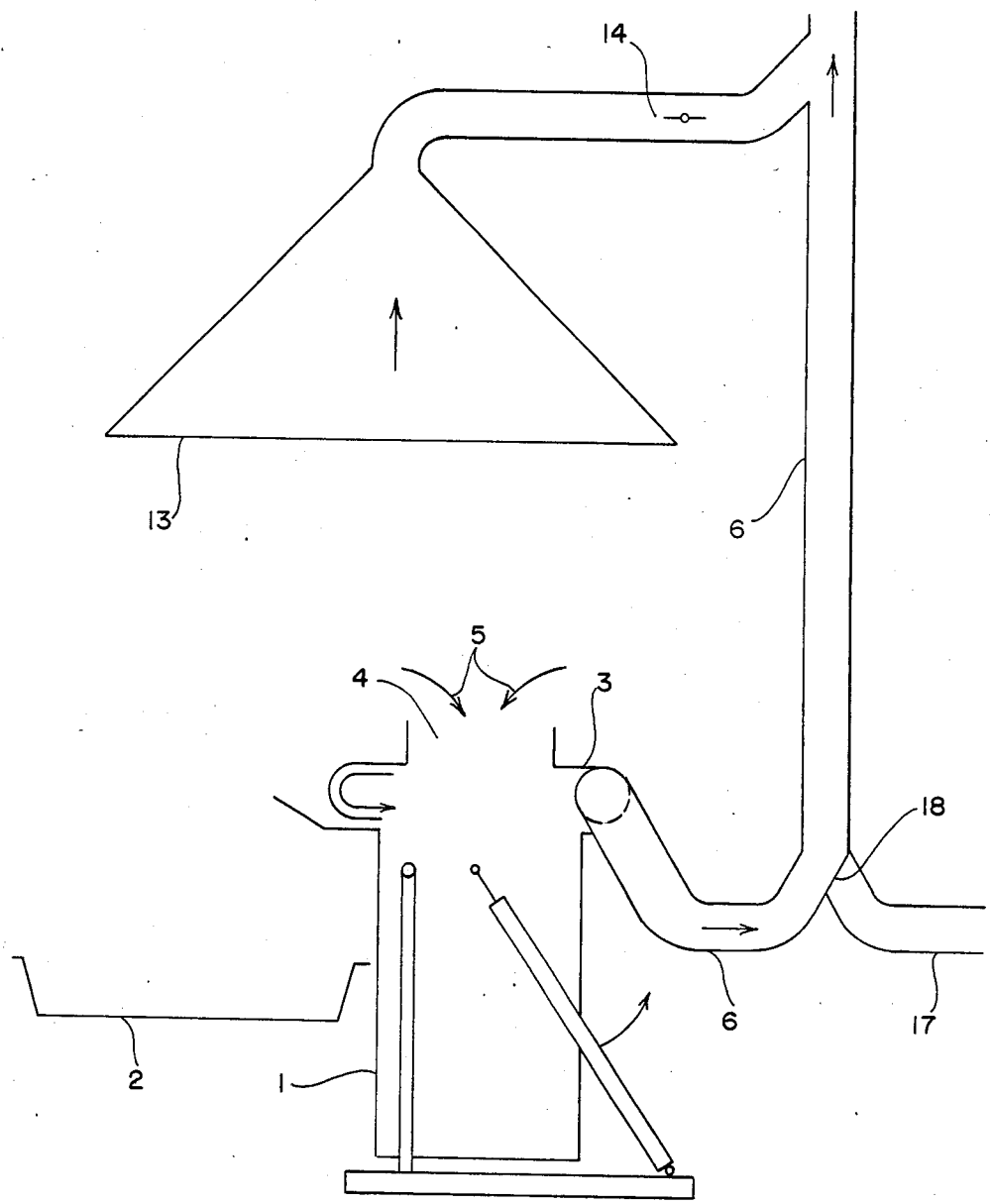

United States Patent [19]

Maillet

[11] Patent Number: 4,675,048
[45] Date of Patent: Jun. 23, 1987

[54] ELECTROTHERMAL PROCESS AND PLANT FOR THE SEPARATION AND REFINING OF METAL FROM WASTE

[76] Inventor: Alain Maillet, Bout de l'Ile, F - 33460 Macau, France

[21] Appl. No.: 860,893

[22] Filed: May 8, 1986

[30] Foreign Application Priority Data

May 10, 1985 [FR] France ................................ 85 07256

[51] Int. Cl.⁴ .............................................. C22B 4/00
[52] U.S. Cl. .................................. 75/10.14; 75/10.15; 75/10.18; 373/9
[58] Field of Search ..................... 75/10.14, 67, 68, 63, 75/65 R, 10.15, 10.18; 373/9

[56] References Cited

U.S. PATENT DOCUMENTS

| | | | |
|---|---|---|---|
| 2,920,951 | 1/1960 | Bretschneider | 75/67 R |
| 3,761,248 | 9/1973 | Avery | 75/67 R |

FOREIGN PATENT DOCUMENTS

| | | |
|---|---|---|
| 075978 | 9/1982 | European Pat. Off. . |
| 1577619 | 8/1968 | France . |
| 2014102 | 4/1970 | France . |

290035 3/1927 United Kingdom .

*Primary Examiner*—Peter D. Rosenberg
*Attorney, Agent, or Firm*—Robert J. Koch

[57] ABSTRACT

The invention relates to an electrothermal process of separation and refining of metals from recovery materials containing a distillable metal, characterized by the fact that it consists:

on the one hand, in a melting stage where the process materials are placed in an electric furnace, in order to vaporize said distillable metal in view of extracting in vacuum the vapor of the distillable metal and subjecting it to oxidization at the same time, and of pouring into ingots the liquid metals remaining in the furnace pot, and, on the other hand, and not dependent on the melting stage, in a distillation stage of the distillable metal oxide thus collected, and a condensation of the resulting metal vapor in order to recover said distillable metal in a liquid form and to pour it into ingots.

Applications: to the recovery of iron, nickel and cadmium contained in electric storage batteries.

7 Claims, 3 Drawing Figures

4,675,048

ELECTROTHERMAL PROCESS AND PLANT FOR THE SEPARATION AND REFINING OF METAL FROM WASTE

This invention relates to the recovery of metals from industrial waste and is described below in reference to its special application as a recovery means of all the metallic materials included in the composition of electric storage batteries with particular attention to: iron, nickel and cadmium but it is understood that it can more generally be used for all metal scraps or industry waste in form of metal, hydrate, oxide or hydroxide.

The recovery of the metals contained in some types of discarded electric storage batteries, and more particularly the recovery of cadmium, has grown to an industrial level and several separation and refining processes have been proposed to this purpose.

According to a known process method described in FR No. 2014 102 for intance, scrap products are sorted manually, those containing cadmium are selected and placed in a sealed bell furnace and cadmium is distilled.

However, it is absolutely necessary to wait for a complete cooling and a thorough elimination of cadmium and cadmium oxide (on account of their toxicity), before the furnace can be opened, the residue taken out and a new charge filled. The residues containing iron, nickel or other components are melted in other furnaces in a conventional way. This procedure requires considerable handling efforts and means a great loss of time between two successive distillations.

Under another process described in EP No. 0075978, an initial pyrolysis of any organic waste present in the process material is followed by a distillation in order to recover cadmium, the next stage is an ingot pouring operation for the residual ferronickel recovered at the end of the whole process. This method has the drawback to be very time-consuming since pyrolysis itself requires twenty hours approximately, as well as the subsequent distillation.

The purpose of the invention is to obviate these disadvantages by proposing a method of recovery of cadmium and also of ferronickel, this method can be carried out within a very short space of time and consequently it provides an inexpensive way of recovering from waste the above-mentioned metal as well as others, either alloyed or not.

To this purpose the object of the invention is an electrothermal process of separation and of refining of metals from waste containing one distillable metal, characterized in the following stages:

the one hand, a melting stage where the waste is placed in the pot of an electric induction or of any similar type furnace; the temperature of the furnace is raised above the vapour temperature of the distillable metal in order to evaporate said metal so that the distillable metal vapour can be vacuum-extracted while being subjected to an oxidizing process by a supply of fresh air and the particles of the oxidized metal can be collected; the furnace temperature is raised to a level for which practically there is no more distillable metal in the furnace pot, and the remaining metal materials are in liquid form and are subsequently poured into ingots.

On the other hand, a distillation stage not dependent on the melting stage, where the distillable metal oxide particles collected are mixed with a deoxidizing substance, the mixture is heated beyond the vapour temperature of said metal, next the metal vapour collected is condensed in order to collect the distillable metal in form of a liquid that is poured into ingots.

When applied to the recovery of cadmium-nickel storage batteries, this process gives the possibility, first, to obtain ferronickel ingots free of any cadmium, containing only nickel and iron as major components, and, second, at the distillation stage, to obtain cadmium ingots of 99.95% purity, while the time required for both operations is approximately one hour for processing two tons of raw waste.

Figure 2:
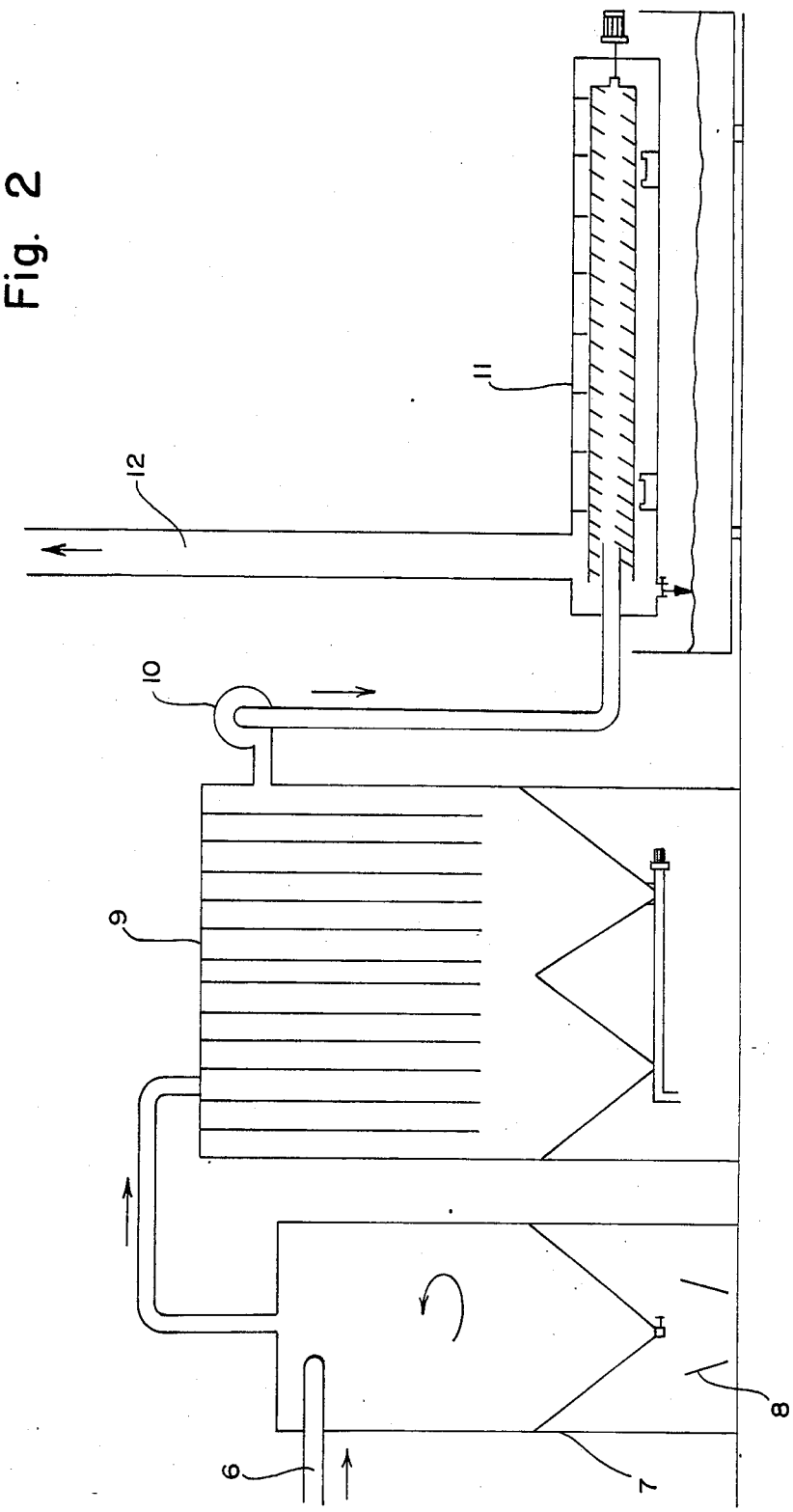
Figure 3:
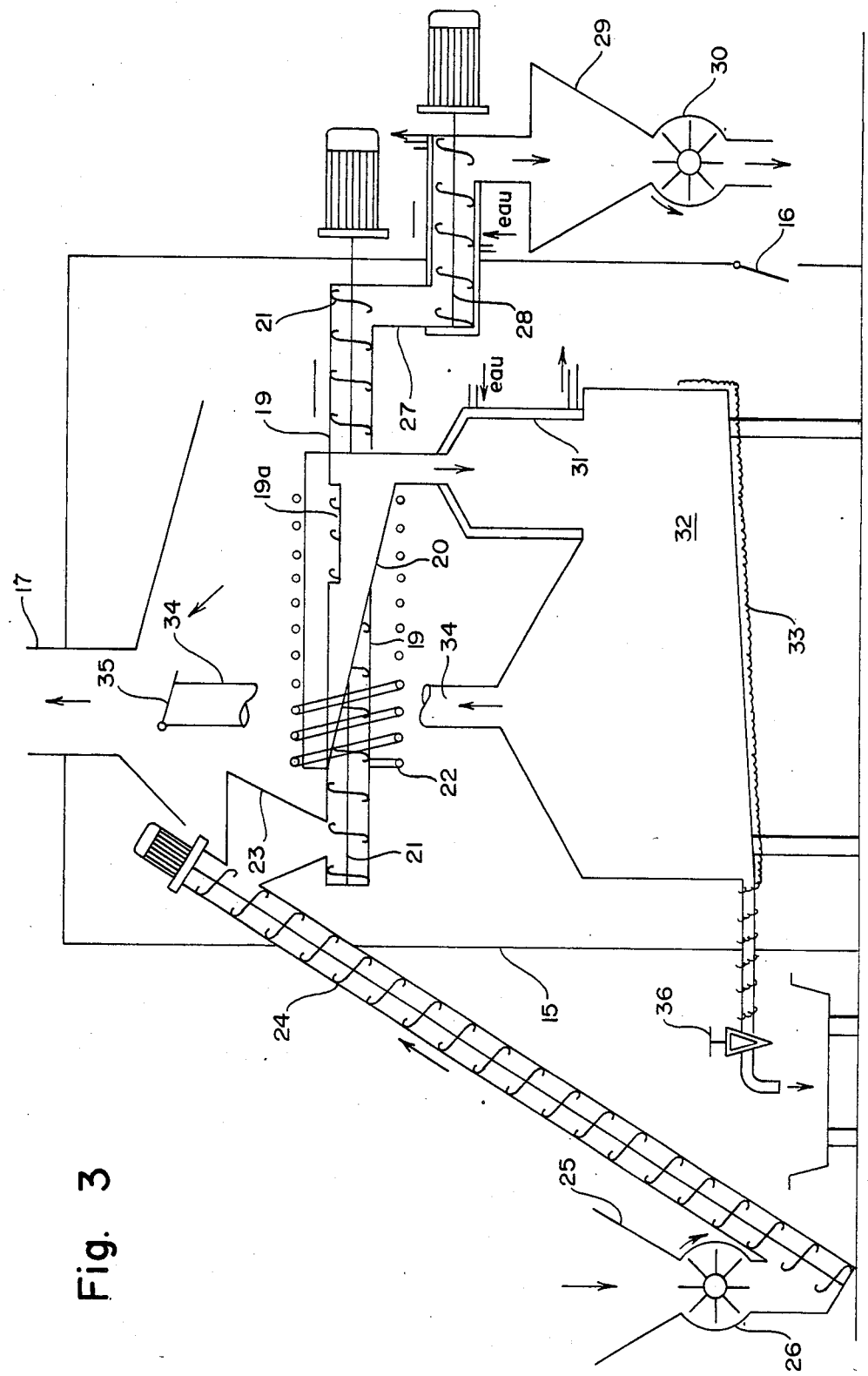

Other characteristics and advantages will appear from the following description, covering a plant for the implementation of the above-described process, it being understood that the description is given by way of example only, and with reference to the enclosed drawings where:

FIG. 1 is a diagrammatic view of a portion of a plant according to the invention used for the melting stage, FIG. 2 is a diagrammatic view of the means for collecting cadmium oxide dust associated with the melting device of FIG. 1, and, FIG. 3 is a diagrammatic view of a distillation plant according to the invention.

The drawings are a diagrammatic representation of a complete unit utilizing the process of the invention as applied to the recovery of cadmium on the one side and of ferronickel on the other side, from nickel-cadmium storage batteries.

In FIG. 1, there is a pot 1 of a conventional electrical induction furnace with hydraulically-operated tilting.

There is an ingot mould 2 by the furnace.

Above the furnace 1 there is a gas ring collector 3 provided with a top opening 4 to allow a large volume supply of fresh air 5 from the atmosphere.

The collector 3 is connected with a gas piping 6 opening into a cyclone precipitator 7 (FIG. 2) permitting thereby to collect a good portion of cadmium oxides at 8. On the outlet of the cyclone 7, the air is collected and directed towards a hose dust separator 9.

Air is taken from the dust separator outlet by an exhaust fan 10 that directs fumes and gases carried in the air to a pressure water bubbling system 11, with residual gases vented to the atmosphere through a smoke-stack 12.

The furnace 1 and ingot mould 2 assembly is topped with a hood which is connected with pipe 6 via a pipe 14.

The device illustrated in FIG. 3 consists of an armoured cell 15 to which no access is provided to the personnel during the distillation operation that is controlled from the outside via a control desk and tight glass windows. A valve 16 is provided at the base of the cell wall 15 and opens so that it provides an inward air flow, with a slight depression arranged in the cell 15 in order that no gas can leak from the cell that is, furthermore, connected to pipe 6 via a pipe 17 (FIG. 1), with a damper 18 fitted at the meeting point of pipes 6 and 17.

A distiller is mounted inside the cell 15 whose major component is a refractory metal tube 19 with an opening at the top 19a and a recovery portion 20 similar to a retort turned downward.

Inside the tube 19 there is an endless screw 21 made of refractory metal too. The assembly 19–21 is surrounded with an electric induction heating coil 22.

Above the tube 19 and outside the coil 22 there is a hopper 23 connected—via an endless screw conveyor 24 passing through the wall of cell 15—with an external filling hopper 25 provided with a sealed rotary distributor 26.

After the tube 19 and outside the coil 22, there is a lock chamber 27 connected—via en endless screw conveyor 28 passing through the wall of cell 15—with an external hopper 29 provided with a sealed rotary distributor 30. The conveyor 28 is cooled by water circulation.

The outlet 20 of tube 19 is connected with a water-cooled vertical pipe 31 which opens into a sealed container 32 and is heated by electric heating resistors 33.

The assembly 31-33 is arranged inside the cell 15 and is a sealed construction like tube 19 with only one shaft 34 that comes out of container 32 and owing to a slight pressure retaining alve 35 it permits to allow gases to escape toward the pipe 17, connected in turn with the pipe 6.

The portion of the plant shown in FIG. 1 carries out the melting stage. To this purpose, the furnace pot 1 is filled with the process charge, that is, in the case of the recovery of iron, nickel and cadmium from discarded or disused nickel-cadmium storage batteries, storage battery cases of whatever size and without a preliminary crushing.

As soon as the furnace temperature is 765° C. and more, the cadmium contained in the waste vaporizes. The cadmium gas, fumes and other gases are sucked in by the collector 3. They are cooled down by an abundant supply of fresh air 5 and cadmium vapours are converted into cadmium oxide. The air carrying the oxide is directed through the pipe 6 (as the register 18 closes the pipe 17) toward the cyclone 7, the dust separator 9, owing to a slight vacuum produced by the exhaust fan 10.

After crossing the dust collector 9, fumes and gases are collected by the fan 10 to be directed under pressure into the water bubbling system 11, in order to have specially the very fine cadmium oxide and other solid particles removed before allowing gas residues to be vented to the atmosphere through the smoke-stack 12.

During the cadmium oxide recovery, the temperature in the furnace 1 has been increasing further. When the temperature has reached 1450° C. or so, the pot does not contain any cadmium any more, the items remaining are iron and nickel. The pot contents can then be poured into the ingot mould 2 by tilting the furnace 1 in order to obtain ingots of ferronickel alloy whose composition can be checked by means of a mass analyzer. At the time of the ingot pouring, the register 18 is set in order to seal the collector 3, fumes and gases are collected by the hood 13 and fed into the pipe 6; the change in the setting of the register 18 gives the possibility, during the pouring, to process in 7-9-11 the fumes and gases with a possible charge of cadmium from the distillation cell 15.

Cadmium oxide from container 8 and also from dust collector 9 is mixed with a deoxidizing substance, such as crushed coal for instance, and is carried into the hopper 25 by any suitable means. (FIG. 3)

The mixture is carried into the hopper 23 by the conveyor 24 and into the distillation tube 19 by conveyor 21.

There, cadmium oxide is distilled at the temperature of 765° C. in neutral atmosphere owing to the combustion of coal. The coil 22 heats the inside of tube 19 to approximately 950° C. for instance.

Non-metallic ashes are collected by the cooled conveyor 28 and discharged through the hopper 29 and the sealed lock chamber 30.

The cadmium vapour produced in tube 19 comes into the cooled tube 31 where it immediately precipitates as droplets and turns to liquid metal cadmium when the temperature is less than 700° C. Droplets fall into the container 32 kept at a constant temperature of approximately 350° C., t.i. just above the melting temperature of cadmium (321° C.)

When the metal in melted conditin in the container 32 has reached a pre-set level, a valve 36 permits to pour the metal outside the cell 15 in order to obtain ingots of cadmium with 99.95% purity with ±0.01% accuracy.

The distillation operation (recovery of cadmium) is made by turns with the melting operation (recovery of iron and nickel), when the volume of cadmium oxide collected into the devices 7 and 9 is adequate. It is obvious that a simultaneous operation could be feasible provided an appropriate system of pipes is installed between the dust collector unit 7-9 and the furnace 1 on the one hand and the cell 15 on the other hand. On the other hand, the hopper 25 can be supplied with cadmium oxide from said assembly 7-9 and with crushed coal by a powered automatic system.

According to a preferred form of the invention, all the apparatuses of the plant are provided with electric safety systems and gas, pressure and temperature sensors, connected with a programmable sequence automaton and a mimic panel of the operation of the whole plant.

Therefore this plant permits to recover ferronickel in the first place, next, cadmium, all operations being carried out in a very short period, for instance, one hour to process two tons of raw recovery material.

More generally, the invention is applied to the recovery of any distillable metal contained in recovery products as well as in any metal waste and/or discarded products, in form of metal, hydrate, oxide or hydroxide. Finally, the process of the invention can be applied to the processing of any ore containing one or more distillable metals.

I claim:

1. An electrothermal process for the separation and refining of metals from a waste material containing a distillable metal comprising the steps of:
   providing a waste material comprising at least one distillable metal;
   heating said waste material to a temperature in excess of the vaporization temperature of said distillable metal contained therein to vaporize said distillable metal and cause said metal to be removed from said waste material;
   recovering said vaporized metal from contact with said waste material by means of an applied vacuum and in the presence of externally supplied air to convert said vaporized metal to particles of the corresponding metal oxide;
   recovering any residual metallic residues remaining in said waste material subsequent to removal and recovery of said distillable metal;
   admixing said particles of metal oxide with a reducing agent;
   heating said admixture of said particles and said reducing agent to a temperature above the vaporization temperature of said metal to vaporize said metal in a neutral atmosphere; and
   condensing said vaporized metal and recovering the same in the form of the substantially pure metal.

2. The process of claim 1 wherein said waste material comprises iron, nickel and cadmium and said waste material is heated to a temperature in excess of the vaporization temperature of cadmium to result in the separation of said cadmium from the waste material.

3. The process of claim 1 wherein said waste material is heated in an electric induction furnace.

4. The process of claim 1 wherein said residual metals are recovered in the form of ingots.

5. The process of claim 1 wherein said condensed metal is recovered in the form of ingots.

6. An apparatus for use in the electrothermal separation and refining of metals from a waste material comprising induction furnace means adapted to heat said waste material to a temperature in excess of the vaporization temperature of a distillable metal contained therein;

air inlet means to supply air to said induction furnace;

means to supply metal-containing waste material to said induction furnace;

means to recover vaporized metal from said induction furnace;

means to condense and recover said vaporized metal in the form of metal oxide particles;

to heat said metal oxide particles to a temperature in excess of the vaporization temperature of the metal; and means to condense and recover said vaporized metal in the form of substantially pure metal.

7. The apparatus of claim 9 further including means to recover said vaporized metal from said induction furnace under reduced pressure.

* * * * *